United States Patent
Beach et al.

(10) Patent No.: US 9,596,202 B1
(45) Date of Patent: Mar. 14, 2017

(54) METHODS AND APPARATUS FOR THROTTLING ELECTRONIC COMMUNICATIONS BASED ON UNIQUE RECIPIENT COUNT USING PROBABILISTIC DATA STRUCTURES

(71) Applicant: SendGrid, Inc., Boulder, CO (US)

(72) Inventors: Aaron Beach, Lakewood, CO (US); Timothy Michael Jenkins, Riverside, CA (US)

(73) Assignee: SendGrid, Inc., Denver, CO (US)

( * ) Notice: Subject to any disclaimer, the term of this patent is extended or adjusted under 35 U.S.C. 154(b) by 0 days.

(21) Appl. No.: 15/248,642

(22) Filed: Aug. 26, 2016

Related U.S. Application Data

(60) Provisional application No. 62/211,381, filed on Aug. 28, 2015.

(51) Int. Cl.
  *G06F 15/173* (2006.01)
  *H04L 12/58* (2006.01)
  *G06N 7/00* (2006.01)

(52) U.S. Cl.
  CPC ............ *H04L 51/12* (2013.01); *G06N 7/005* (2013.01); *H04L 12/585* (2013.01)

(58) Field of Classification Search
  CPC ... H04L 51/12; H04L 12/585; H04L 63/1416; H04L 63/1425
  See application file for complete search history.

(56) References Cited

U.S. PATENT DOCUMENTS

| | | | | |
|---|---|---|---|---|
| 7,366,761 B2 * | 4/2008 | Murray | ............... | H04L 12/58 709/206 |
| 8,601,064 B1 * | 12/2013 | Liao | ............... | H04L 51/12 709/206 |
| 8,924,488 B2 * | 12/2014 | Bobotek | ............... | H04L 51/12 455/412.1 |
| 2003/0167402 A1 * | 9/2003 | Stolfo | ............... | H04L 63/1425 726/23 |
| 2004/0177120 A1 * | 9/2004 | Kirsch | ............... | H04L 12/585 709/206 |
| 2005/0021649 A1 * | 1/2005 | Goodman | ............... | G06F 21/316 709/207 |
| 2005/0080857 A1 * | 4/2005 | Kirsch | ............... | H04L 12/58 709/206 |
| 2005/0091320 A1 * | 4/2005 | Kirsch | ............... | H04L 51/12 709/206 |

(Continued)

*Primary Examiner* — Tom Y Chang
(74) *Attorney, Agent, or Firm* — Cooley LLP

(57) ABSTRACT

In some embodiments, a mail verification server can use probabilistic methods to determine whether a user's emails should be throttled based on the recipients to which the user sends emails. The mail verification server can estimate a number of unique recipients to which a user has sent emails in the past, and can estimate whether the rate of which the number of unique recipients increases crosses over a predetermined threshold. The mail verification server can determine that a new user has sent emails to 500 unique recipients, and can track the rate at which the number of unique recipients rises. The mail verification server can then throttle the user's emails if the rate at which the number of unique recipients rises exceeds threshold (e.g., if the number of unique recipients the user has contacted rises by 200% and/or a similar threshold).

20 Claims, 7 Drawing Sheets

(56) References Cited

U.S. PATENT DOCUMENTS

| | | | |
|---|---|---|---|
| 2006/0075489 A1* | 4/2006 | Ganguly | H04L 29/06027 726/22 |
| 2007/0118759 A1* | 5/2007 | Sheppard | G06F 21/552 713/188 |
| 2009/0037546 A1* | 2/2009 | Kirsch | G06Q 10/107 709/206 |
| 2009/0089877 A1* | 4/2009 | Bolinger | G06F 21/554 726/22 |
| 2012/0028606 A1* | 2/2012 | Bobotek | H04L 51/12 455/411 |
| 2012/0030293 A1* | 2/2012 | Bobotek | G06Q 10/10 709/206 |
| 2013/0159251 A1* | 6/2013 | Skrenta | G06F 17/30339 707/612 |
| 2015/0381653 A1* | 12/2015 | Starink | H04L 63/1408 726/22 |

\* cited by examiner

METHODS AND APPARATUS FOR THROTTLING ELECTRONIC COMMUNICATIONS BASED ON UNIQUE RECIPIENT COUNT USING PROBABILISTIC DATA STRUCTURES

CROSS-REFERENCE TO RELATED APPLICATION

This application claims priority to and the benefit of U.S. provisional application Ser. No. 62/211,381, filed Aug. 28, 2015 and entitled, "METHODS AND APPARATUS FOR THROTTLING ELECTRONIC COMMUNICATIONS BASED ON UNIQUE RECIPIENT COUNT USING PROBABILISTIC DATA STRUCTURES." The entire content of the aforementioned application is hereby expressly incorporated by reference.

FIELD

One or more methods and apparatus described herein are generally related, for example, to throttling electronic communications based on unique recipient counts, using probabilistic data structures.

BACKGROUND

Servers, such as email servers, can be configured to limit spam (e.g., such as email spam) and/or unwanted traffic. Some known solutions throttle (e.g., reduce and/or limit) the total amount of messages a user can send within a predetermined time period (e.g., a day, an hour, and/or the like). Such known solutions can also use information about the user, such as how many emails the user usually sends, the user's reputation (e.g., whether or not the user tends to send spam emails frequently), and/or other such information. Such methods, however, can cause new users who naturally send a large volumes of emails (and/or who may need to send a large volume of email when they sign up for the service) to be incorrectly throttled under suspicion of sending spam email. Additionally, such methods can cause servers to not throttle users with good reputations, on account of their reputations, even when their accounts have been compromised.

Accordingly, a need exists for methods and apparatus that can determine when to throttle emails from a user's account, without relying only on a user's reputation or average volume of emails.

SUMMARY

In some embodiments, a mail verification server can use probabilistic methods to determine whether a user's emails should be throttled based on the recipients to which the user sends emails. For example, the mail verification server can estimate a number of unique recipients to which a user has sent emails in the past, and can estimate whether the rate of which the number of unique recipients increases crosses over a predetermined threshold. The mail verification server, for example, can determine that a new user has sent emails to 500 unique recipients, and can track the rate at which the number of unique recipients rises. The email verification server can then throttle the user's emails if the rate at which the number of unique recipients rises exceeds threshold (e.g., if the number of unique recipients the user has contacted rises by 200% and/or a similar threshold). By using a rate of unique recipients as a metric for throttling user emails (e.g., instead of a number of emails, or a total number of unique recipients), new users with large distribution lists can send a large volume of emails to common recipients, without incorrectly being flagged as spam users.

Additionally, in some embodiments, the mail verification server can use a probabilistic data structure to store data about users' unique recipients. Probabilistic data structures can contain small amounts of data that can be used to estimate a variety of information, such as whether a user has likely sent correspondence to a particular recipient, and/or the like. Using a probabilistic data structure can prevent recipient lists from being compromised (e.g., as the actual recipient data may not be in the probabilistic data structure), and can allow for more resource and time-efficient recording and tracking of whether or not a user has sent an email to a recipient before.

DETAILED DESCRIPTION

Figure 1:
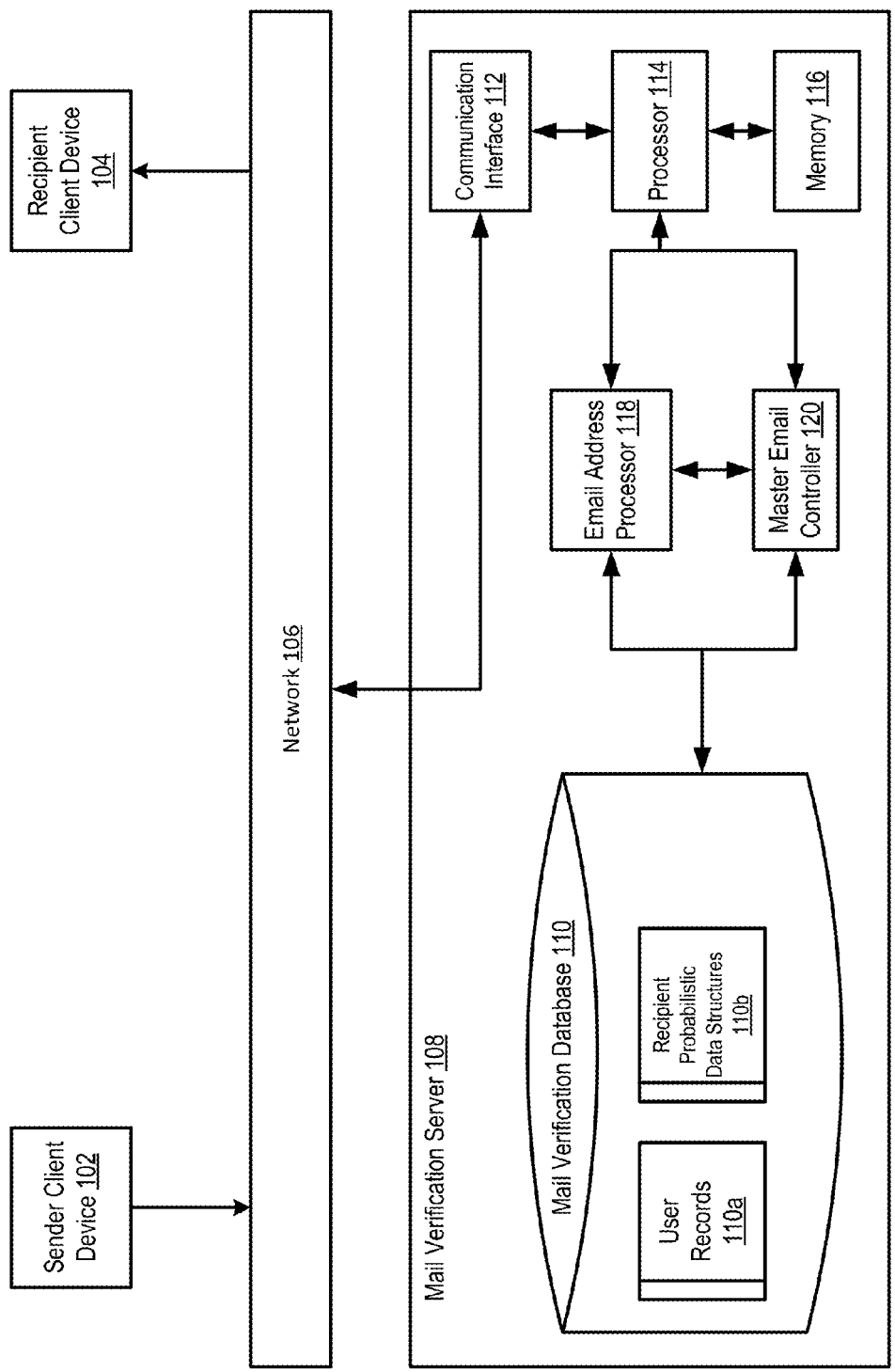
FIG. 1 is a schematic diagram illustrating a mail verification server, according to an embodiment.

FIG. 1 is a block diagram illustrating a sender client device 102, a recipient client device 104, and a mail verification server 108. For example, in some implementations, a mail verification server 108 can include at least one communication interface 112, at least one processor 114, at least one memory 116, and/or at least one mail verification database 110. The at least one processor 114 can be any hardware module and/or component configured to receive and process data, and/or to execute code representing executable instructions. In some embodiments, the at least one processor 114 can be a general purpose processor, a Field Programmable Gate Array (FPGA), an Application Specific Integrated Circuit (ASIC), a Digital Signal Processor (DSP), and/or the like.

The at least one memory 116 can be a hardware module and/or component configured to store data accessible by the at least one processor 114, and/or to store code representing executable instructions for the at least one processor 114. The memory 116 can be, for example, a random access memory (RAM), a memory buffer, a hard drive, a database, an erasable programmable read-only memory (EPROM), an electrically erasable read-only memory (EEPROM), a read-only memory (ROM) and/or the like. In some embodiments, the memory 116 can store instructions to cause the at least one processor 114 to execute modules, processes and/or functions associated with a mail verification server 108.

The at least one processor 114 can implement a number of modules and/or server components, including but not limited to an email address processor 118 and a master email controller 120. The at least one processor 114 can be configured to execute instructions generated by any of the modules and/or server components, and/or instructions stored in the memory 116. In some implementations, if the mail verification server 108 includes multiple processors 114, the modules and/or server components can be distributed among and/or executed by the multiple processors 114. The at least one memory 116 can be configured to store processor-readable instructions that are accessible and executable by the at least one processor 114.

The at least one communication interface 112 can be any hardware and/or software implemented in hardware configured to allow communication between the mail verification server 108 and a sender client device 102 and/or a recipient client device 104, e.g., via a network 106. For example, if the network 106 is a wireless network, the at least one communication interface 112 can be a circuit and/or similar device connected to the at least one processor 114 and configured to send data from the at least one processor 114, via the wireless network 106 (e.g., via Wi-Fi or Bluetooth), to the recipient client device 104. If the network 106 is a wired network, the at least one communication interface 112 can be a circuit and/or similar device connected to the at least one processor 114 and configured to send data from the at least one processor 114, via a wired connection to the network 106 (e.g., via Ethernet and/or a similar wired network technology), to the recipient client device 104 connected to the network 106. The at least one communication interface 112 can also receive data sent from the sender client device 102, via a connection to the network 106, and can provide the data to the at least one processor 114 for processing.

In some implementations, the modules and/or server components can be implemented on the at least one processor 114 (e.g., as software executed on and/or implemented by the at least one processor 114). In some implementations, the modules and/or server components can be software stored in the memory 116 and executed by the processor 114. In other implementations, the modules and/or server components can be any assembly and/or set of operatively-coupled electrical components separate from the at least one processor 114 and the at least one memory 116, including but not limited to field programmable gate arrays (FPGAs) and/or application-specific integrated circuits (ASICs).

An email address processor 118 can be a module and/or server component configured to process recipient email addresses to determine whether a user account is likely to have previously sent email to the recipient. For example, the email address processor 118 can normalize and/or otherwise transform a recipient email address for processing (e.g., can generate a hash value based on the recipient email address, can remove and/or alter portions of a string representing the recipient email address to conform with a recipient email address format for processing, so as to generate a normalized string value, and/or can perform other functions on recipient email addresses), can determine whether the user has sent an email to the recipient before, and/or can provide a result code to a master email controller 120 indicating whether the recipient can be analyzed as a new, unique recipient, or a recipient to which the user has already sent at least one email. Further details about the email address processor 118 can be found at least in FIGS. 3-4, described in further detail herein.

A master email controller 120 can be a module and/or server component configured to determine when to throttle and/or otherwise modify email traffic from a user account, e.g., based on a rate of unique recipients to which the user account is sending emails. For example, the master email controller 120 can receive a result code from the email address processor 118, can calculate a recipient change rate (e.g., a rate at which unique recipients are added to a user's collection of known recipient addresses), and can determine whether the recipient change rate has exceeded a recipient change rate threshold. Further details about the master email controller 120 can be found at least in FIGS. 3 and 5, described in further detail herein.

The at least one mail verification database 110 can be a data store and/or memory configured to store multiple records relating to user records 110a and/or recipient probabilistic data structures 110b. Tables in the at least one mail verification database 110 can be distributed across multiple databases, or can be stored in one database. The user records table 110a can include information about a user account for a user sending emails, such as but not limited to a user identifier, a user name, a user email address, a user password, a user's recipient change rate, a user's last-calculated total number of estimated unique recipients, a link (e.g., an identifier and/or hash value) to a recipient probabilistic data structure associated with the user and stored in the recipient probabilistic data structures table 110b, a date the user opened her account, and/or other user information.

The recipient probabilistic data structures table 110b can include recipient probabilistic data structures associated with various users sending emails through the mail verification server 108. For example, each record in the recipient probabilistic data structures table 110b can include a record identifier, a link to a corresponding user account (e.g., an identifier and/or other information associated with the user account record in the user records table 110a), a recipient probabilistic data structure (e.g., table and/or similar data structure including recipient address codes), a date the record was last updated, an estimated number of recipient email addresses represented by the recipient probabilistic data structure, and/or similar information. More information on recipient probabilistic data structures can be found at least in FIG. 4, described in further detail herein.

Each of a sender client device 102 and a recipient client device 104 can be a personal computer (e.g., a user laptop and/or desktop computer) and/or a mobile electronic device (e.g., a mobile phone, a tablet, a personal digital assistant (PDA), and/or a similar device) able to send and/or receive email messages. Each of the sender client device 102 and the recipient client device 104 can include at least a processor (e.g., similar to a processor 114 in the mail verification server 108), a memory (e.g., similar to a memory 116 in the mail verification server 108), a communication interface (e.g., similar to the communication interface 112 in the mail verification server 108), a display device for rendering email messages, and/or an input interface (e.g., a touch screen, keypad, keyboard, and/or similar interface) for inputting email message information.

Figure 2:
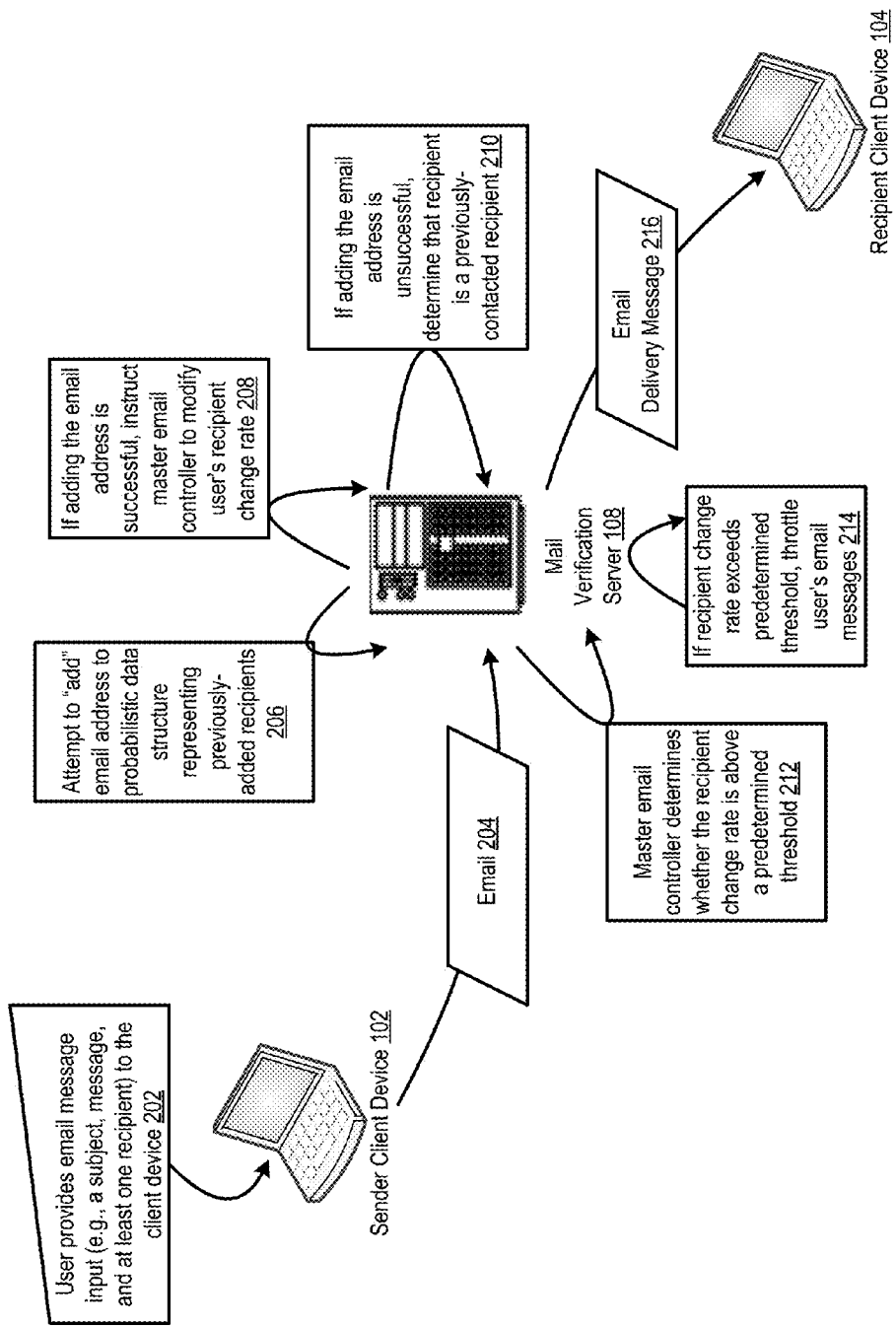
FIG. 2 is a schematic diagram illustrating a process for determining whether or not to throttle a user account, according to an embodiment.

FIG. 2 is a schematic diagram illustrating a process for determining whether or not to throttle a user account. For example, in some implementations, a user can input 202 email message data (including but not limited to an email subject, an email message, and at least one recipient of the email message), e.g., into a sender client device 102 as described in the discussion of FIG. 1. After receiving the email message input, the sender client device 102 can send the email message 204 to the mail verification server 108 for processing and/or transmission to the recipient. The mail verification server 108 can attempt to "add" 206 the recipient's email address to a probabilistic data structure corresponding to the user's user account (e.g., as stored in the mail verification database 110). In some implementations, "adding" a recipient email address to the probabilistic data structure can include modifying the probabilistic data structure in some manner to indicate the use of a new recipient email address (e.g., by modifying values in the probabilistic data structure corresponding to a location in the probabilistic data structure related to the recipient email address, and/or by modifying values in the probabilistic data structure through similar means). More information on the modification of probabilistic data structures can be found at least in FIG. 4, described in further detail herein.

When the recipient email address can be "added" to the probabilistic data structure 208 (e.g., when the probabilistic data structure can be modified in response to the mail verification server 108 encountering the recipient email address), the mail verification server 108 can interpret the successful operation to mean that the recipient email address is most likely a new, unique recipient email address for the user, and can instruct (e.g., via the at least one processor 114) the master email controller 120 to modify a user's recipient change rate based on the unique recipient email address. More information on the modification of the recipient change rate can be found at least in FIG. 5, described in further detail herein. When the recipient email address cannot be "added" to the probabilistic data structure 210 (e.g., when the probabilistic data structure cannot be modified in response to the mail verification server 108 encountering the recipient email address), the mail verification server 108 can interpret the failed operation to mean that the recipient email address has most likely been used before by the user, and may not instruct the master email controller 120 to alter the recipient change rate of the user.

The master email controller 120 of the mail verification server 108 can then determine 212 whether or not the user's recipient change rate exceeds a predetermined threshold (e.g., a recipient change rate threshold), and can throttle 214 email messages sent by the user if the recipient change rate does exceed the predetermined threshold. When the user's recipient change rate exceeds the predetermined threshold, the master email controller 120, for example, can throttle all emails sent by the user, can throttle emails sent to unique recipients, and/or can completely stop emails sent by the user from being delivered to the recipients of each of the emails. In some implementations, the master email controller 120 can restore sending conditions (e.g., can reduce and/or eliminate throttling of the user's emails, and/or can begin to send emails sent from the user) after the user's recipient change rate falls below the predetermined threshold, and/or after the user meets other criteria (e.g., the master email controller 120 has determined that the email from the user is not spam, e.g., based on user feedback and/or analysis of the email, and/or based on similar criteria). In some implementations the threshold can be a static threshold value, and/or can be a threshold dynamically determined, e.g., using machine learning techniques and data relating to other users sending emails through the mail verification server 108 (e.g., including but not limited to recipient change rates of the other users, and/or the like) to refine a threshold for recipient change rates for mail senders, and/or based on similar means. For example, the threshold can be dynamically determined based on an average recipient change rate of the users sending emails through the mail verification server 108, and/or the like. The mail verification server 108 can also deliver 216 the email to the client device of the recipient 104, e.g., if the master email controller 120 has not prevented emails from the user from being sent to the recipient, if delivery of the email is not affected by throttling of the user's emails, and/or the like.

Figure 3:
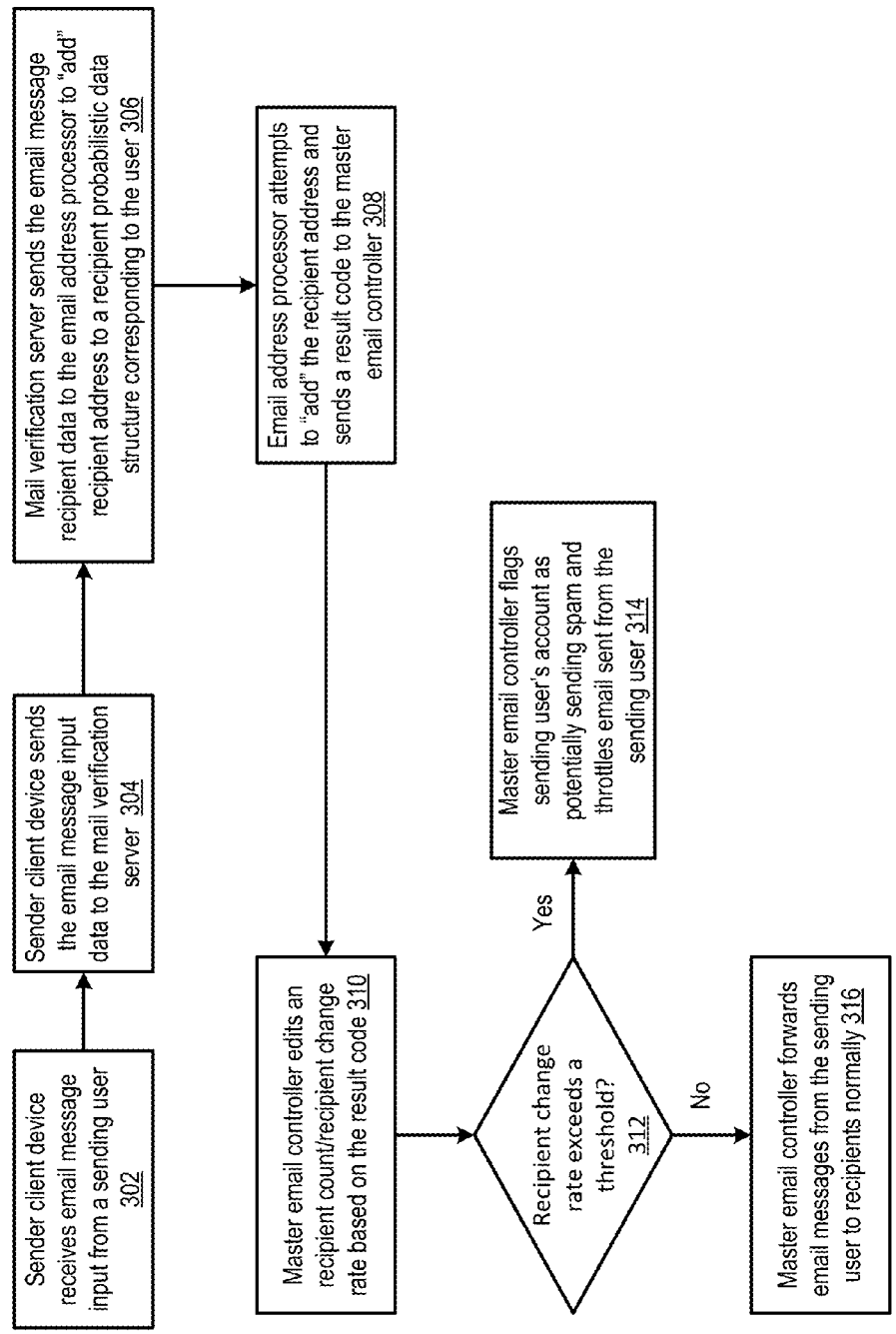
FIG. 3 is a logic flow diagram illustrating a process for determining whether or not to throttle a user account, according to an embodiment.

FIG. 3 is a logic flow diagram illustrating a process for determining whether or not to throttle a user account. For example, in some implementations, the sender client device 102 can receive 302 email message input from a sending user (e.g., a user sending an email message). The message input can include, for example, an email subject, an email message body, an indicator of at least one recipient of the email message, and/or similar information. The sender client device 102 can send 304 the email message input data to the mail verification server 108 for processing, e.g., as an email message from an email message generation interface at the sender client device 102 (e.g., including but not limited to an email application such as Microsoft Outlook and/or Apple Mail, and/or an email web interface such as Gmail and/or the like). The mail verification server 108 (e.g., via the at least one processor 114 at the mail verification server 108 receiving the input from the communication interface 112) can provide 306 the recipient data from the email message to an email address processor 118.

The email address processor 118 can determine whether the recipient email address is a unique recipient address for the user, and/or if the user has likely sent an email to the recipient before. For example, the email address processor 118 can attempt to "add" 308 the recipient email address to a recipient probabilistic data structure corresponding to the user's user account (e.g., using the process described in FIG. 4). The email address processor 118 can also generate a result code from the "add" process, which can be provided to the master email controller 120 for further processing. The master email controller 120 can edit 310 a recipient count value (e.g., a value corresponding to the number of estimated unique recipients to which the user has sent emails) stored in the user's user account data structure in the mail verification database 110. The master email controller 120 can then also calculate a recipient change rate using the modified recipient count value (e.g., using the process described in FIG. 5A).

The master email controller 120 can determine 312 whether the recipient change rate exceeds a predetermined recipient change rate threshold. If the recipient change rate exceeds a predetermined recipient change rate threshold, the master email controller 120 can flag 314 the sending user's account as potentially sending spam, and can throttle email messages sent from the sending user. For example, the master email controller 120 can determine a throttled number of email messages that the user can send for a predetermined period of time, and/or until predetermined criteria have been met. As another example, the master email controller 120 can determine a subset of recipients to which the user has sent emails, to which the user can continue to send messages, e.g., for a predetermined period of time, and/or until predetermined criteria have been met. As another example, the master email controller 120 can completely block email messages sent from the user to any recipients, and/or to a subset of recipients (e.g., to new unique recipients, and/or to a subset of recipients to which the user has already sent emails), e.g., for a predetermined period of time, and/or until predetermined criteria have been met. If the master email controller 120 determines that the recipient change rate does not exceed the predetermined recipient rate change threshold, the master email controller 120 can forward 316 email messages from the sending user to recipients in a normal manner (e.g., without throttled conditions).

Figure 4A:
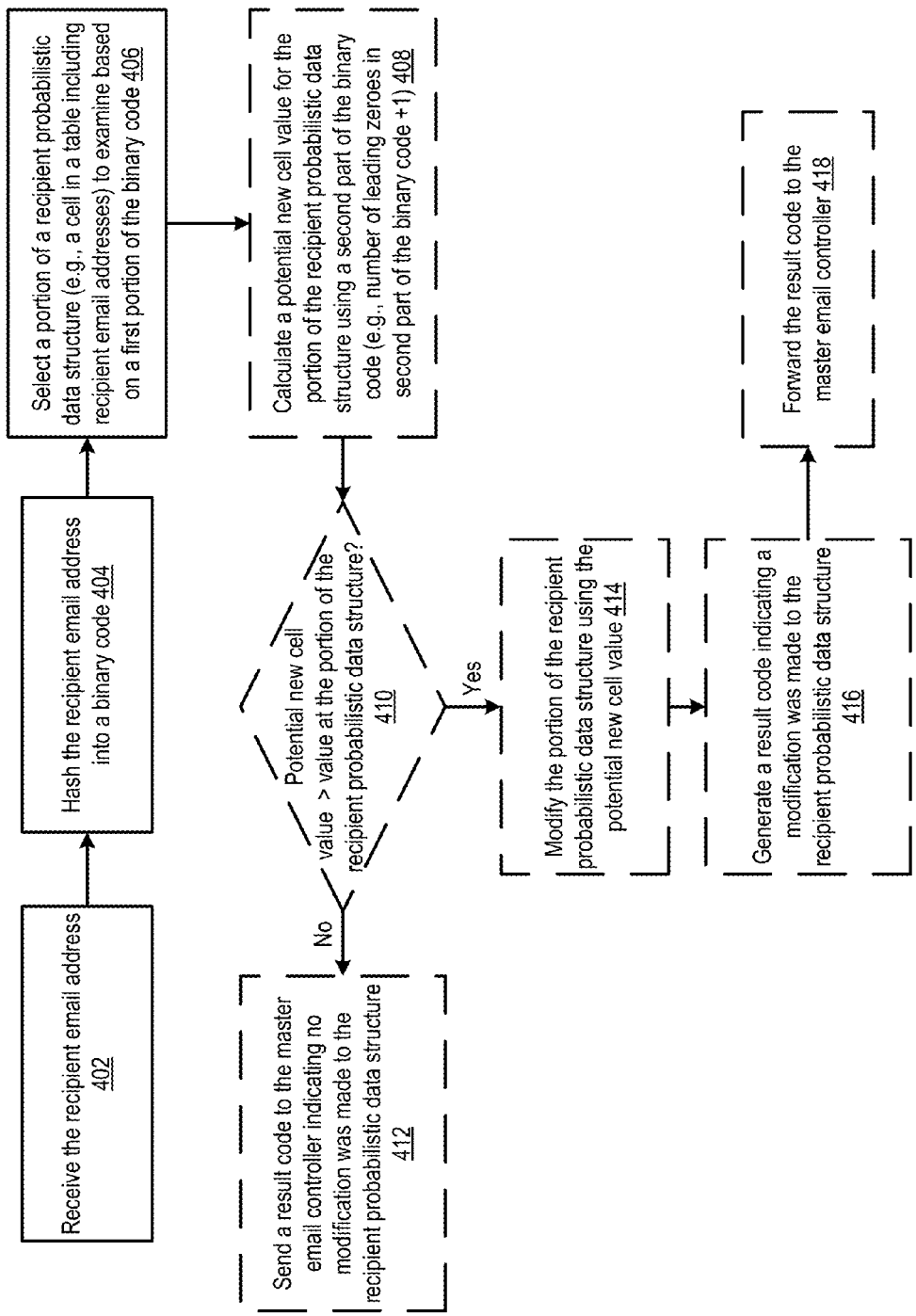
FIGS. 4A-B are logic flow diagrams illustrating a process for modifying an example recipient probabilistic data structure, according to an embodiment.
Figure 4B:
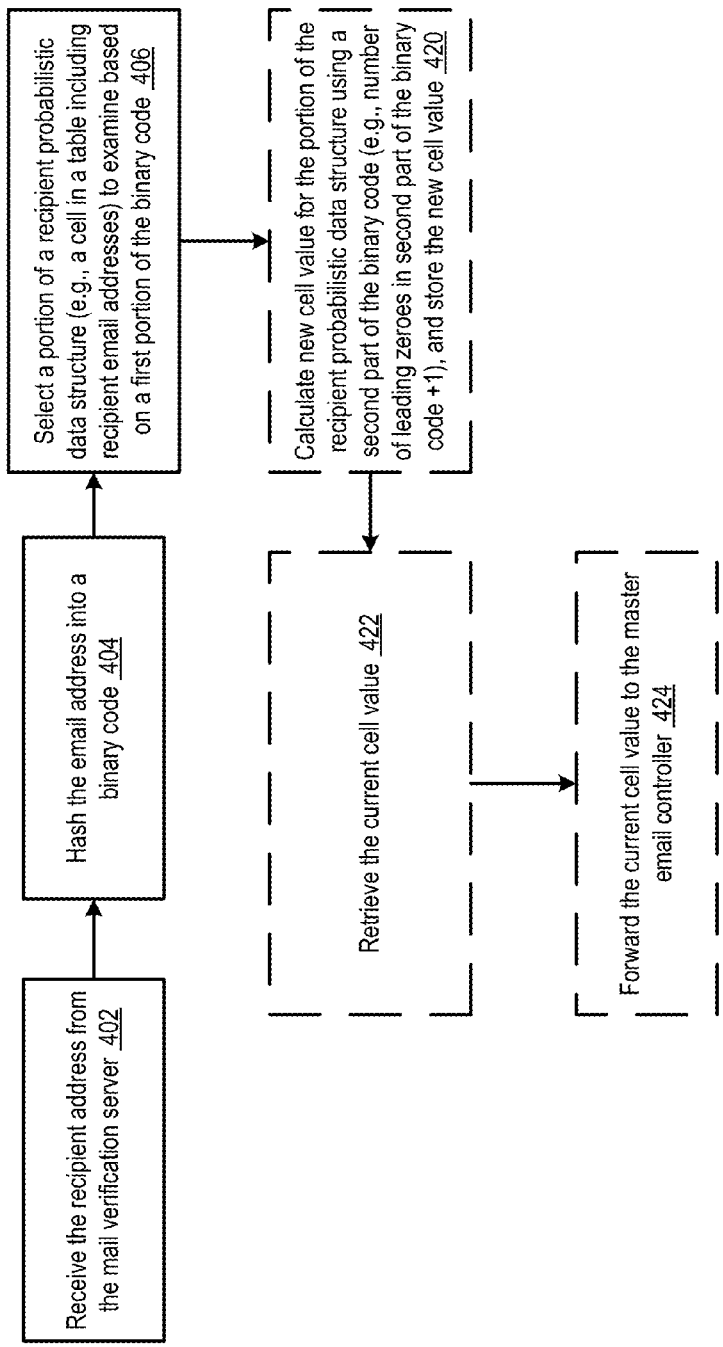

FIGS. 4A-B are logic flow diagrams illustrating a process for modifying an example recipient probabilistic data structure. While the example recipient probabilistic data structure described can be a HyperLogLog data structure, it should be understood that other data structures (e.g., bloom filter data structures, and/or similar data structures) can also be used to track recipient email addresses, and/or to determine throttling settings. For example, in some implementations (e.g., referring to FIG. 4A), an email address processor 118 can receive, at 402, a recipient address, e.g., as a string value, from the mail verification server 108. For example, the mail verification server 108 can receive the recipient address information from an email message received at the communication interface 112 (e.g., received as a data structure containing fields for each of the email message subject, the email message body, an indication of at least one email message recipient, and/or other such information), which can provide the email message to the at least one processor 114. The at least one processor 114 can extract the recipient address from the email message data structure and provide it to the email address processor 118. The email address processor 118 can hash, at 404, the recipient email address string value into a binary code. The binary code can be used, for example, as a key to determine what portion of a recipient probabilistic data structure to analyze. The email address processor 118 can then retrieve a recipient probabilistic data structure uniquely associated with a user account associated with the user, and can select, at 406, a portion of the recipient probabilistic data structure to examine based on a first portion of the binary code.

The recipient probabilistic data structure can be a table, in which each cell of the table includes a value representing a recipient address (e.g., a portion of a binary code generated from a recipient address string value). By modifying cell values in the table based on new, unique recipient email addresses (e.g., based on the portion of a binary code generated from a recipient address string value), the email address processor 118 can estimate whether subsequent recipient email addresses have been encountered by the email address processor 118 (e.g., can determine a likelihood and/or probability that the sender has sent an email address to the recipient email address), e.g., without storing entire recipient address string values and without performing a search on an entire collection of recipient email addresses to determine whether the recipient email address has already been encountered. In some implementations, the first portion of the binary code can be a predetermined number of bits at the beginning and/or end of the binary code that can identify an index of a cell in the recipient probabilistic data structure to analyze. In this manner, the recipient probabilistic data structure may not store actual recipient email addresses; the recipient probabilistic data structure can store binary values (which can be stored using less resources than storing actual recipient email addresses), and can determine a probability and/or likelihood that the recipient email address has been encountered, e.g., based on how the recipient probabilistic data structure has been modified at the time the recipient email address is being analyzed. By using a probability and/or likelihood that the recipient probabilistic data structure has been modified, the email address processor 118 can use less time and processing resources to determine whether or not the recipient email address has been encountered, as the email address processor 118 would not have to store lengthy and/or resource-intensive recipient email addresses. Additionally, the email address processor 118 would not have to search a list of recipient email addresses and/or compare the recipient email address string with recipient email addresses in the list, to determine whether the recipient email address appears in the list, and/or otherwise appears in a user's recipient history. Instead, the email address processor 118 can compare integer values, and/or use a hash value to determine a particular portion of the recipient probabilistic data structure to analyze. These benefits allow the email address processor 118 and the mail verification server 108 overall to operate faster while using fewer processing resources.

The email address processor 118 can calculate, at 408, a potential new cell value for the portion of the recipient probabilistic data structure selected, e.g., using a second portion of the binary code. For example, after using a first portion of the binary code to determine an index of the cell (i.e., a location within the recipient probabilistic data structure), the email address processor 118 can count a number of leading zeroes for the remaining portion of the binary code. The sum of the leading zeroes of the second portion of the binary code can be added to a constant value (e.g., 1 and/or a similar value) to generate the potential new cell value, and/or can represent the potential new cell value without being added to a constant value. The email address processor 118 can then determine, at 410, whether the potential new cell value is greater than the existing value at the selected cell of the recipient probabilistic data structure. For example, the selected cell of the recipient probabilistic data structure can contain a binary value, and the email address processor 118 can compare the binary value at the selected cell with the potential new cell value.

If the potential new cell value is less than or equal to the value at the selected cell, the email address processor 118 can determine that the recipient email address has likely already been "added" to the recipient probabilistic data structure (e.g., that a cell value representing the second portion of the hashed binary value of the recipient email address string has already been added to the recipient probabilistic data structure), and consequently that the recipient email address is not likely to be new for the user. The email address processor 118 can discard the potential new cell value and can send, at 412, a result code to a master email controller 120 at the mail verification server 108, indicating that no modification was made to the recipient probabilistic data structure.

If the potential new cell value is greater than the value at the selected cell, the email address processor 118 can determine that the recipient email address has likely not been "added" to the recipient probabilistic data structure (e.g., that the recipient probabilistic data structure has not yet been modified to include a second portion of the hashed binary value of the recipient email address string), and consequently that the recipient email address is likely to be new for the user. The email address processor 118 can modify, at 414, the portion of the recipient probabilistic data structure, e.g., by replacing the value at the selected cell of the recipient probabilistic data structure with the potential new cell value. The email address processor 118 can also generate, at 416, a result code indicating that a modification was made to the recipient probabilistic data structure, and can forward, at 418, the result code to the master email controller 120.

In some implementations, the email address processor 118 can analyze recipient email addresses belonging to any email domain in this manner; in other implementations, the email address processor 118 can analyze recipient email addresses belonging to particular email domains (e.g., to high-volume email domains, and/or the like). Analyzing recipient email addresses belonging to particular email domains can prevent users from tricking the mail verification server 108, e.g., by constantly sending email to a large number of recipient email addresses belonging to an email domain that the user can control.

In other implementations, at the start of a given interval or time window, the email address processor 118 can save the value of each cell in the recipient probabilistic data structure, e.g., using the master email controller 120 of the mail verification server 108. For example, at the end of the interval or time window, the email address processor 118 can send the current value of each cell in the probabilistic data structure to the master email controller 120 of the mail verification server 108, such that the master email controller 120 stores the cell values in a recipient probabilistic data structure stored in the recipient probabilistic data structure table 110b of the mail verification database 110. The master email controller 120 can also compare changes and/or differences detected in the value of each particular cell value in the recipient probabilistic data structure. For example, a difference between values at a particular cell can represent an estimate of a number of new recipients seen during a particular time window. The master email controller 120 can then set the value of the unique address counter to be equal to the value of the difference between the previous cell value and the received cell value, rather than successively incrementing the unique address counter each time the probabilistic data structure is successfully modified.

Said another way, referring to FIG. 4B, in some implementations, 402-406 can proceed as disclosed in FIG. 4A. Instead of calculating a potential new cell value and then determining whether or not a calculated potential new cell value for the portion of the recipient probabilistic data structure is greater than the existing value at that portion of the recipient probabilistic data structure, the email address processor 118 can, at 420, calculate and then save a new cell value at the portion of the recipient probabilistic data structure (e.g., can store the new cell value for a cell in the recipient probabilistic data structure). The new cell value can, in some implementations, be stored at the beginning of a given interval and/or time window. At the end of the interval and/or time window, the email address processor 118 can, at 422, retrieve the current cell value (the current cell value being the new cell value that was stored at that cell at the beginning of the interval and/or time window). The email address processor 118 can, at 424, forward the current cell value to the master email controller 120. The master email controller 120 can then use the current cell value to determine an estimated number of new recipients (rather than using a result code, as shown in 410-418 of FIG. 4A). In this manner, the email address processor 118 can directly provide the cell values to the master email controller 120 for processing.

Figure 5A:
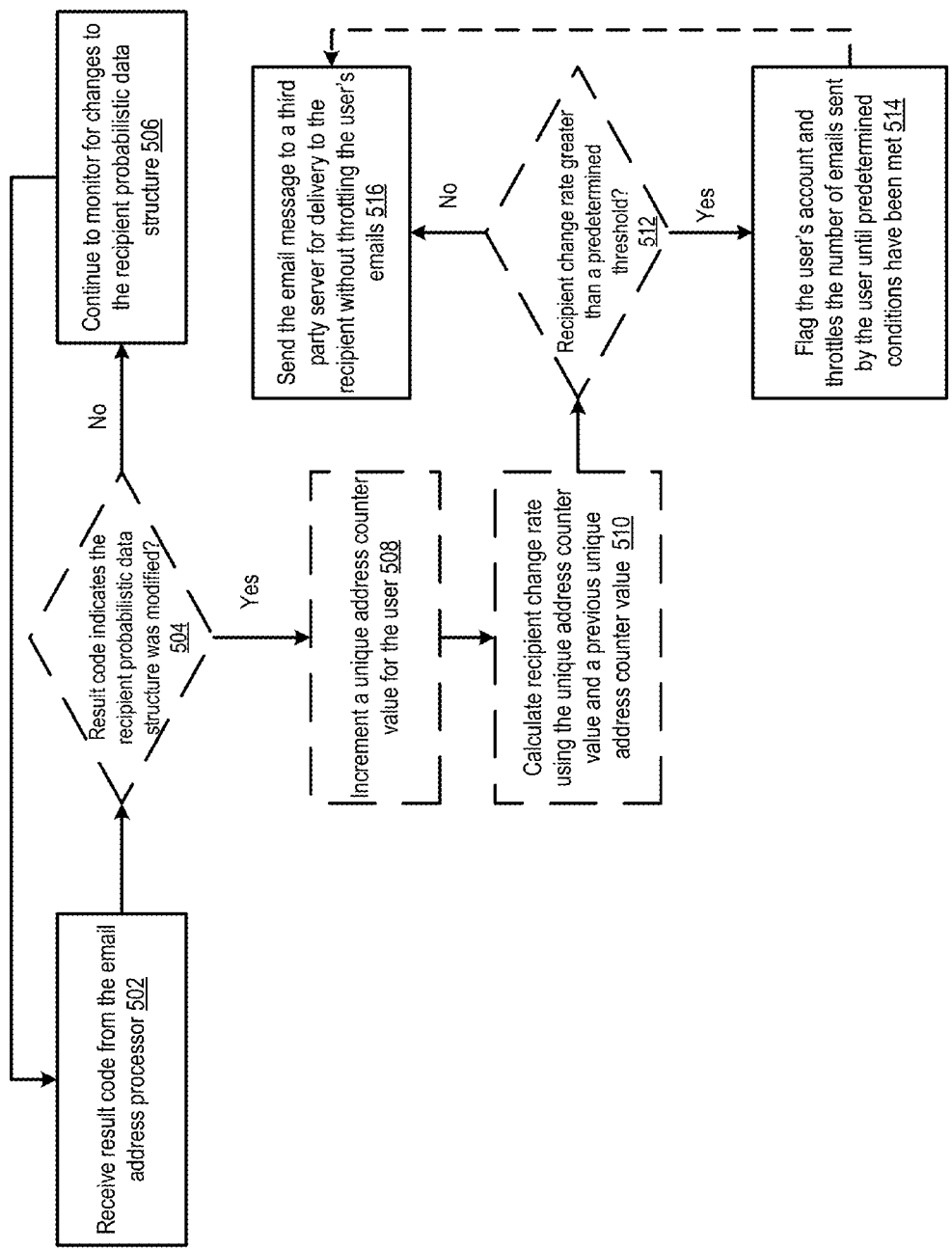
FIGS. 5A-B are logic flow diagrams illustrating a process for using a modified example recipient probabilistic data structure to determine whether or not to throttle a user account, according to an embodiment.
Figure 5B:
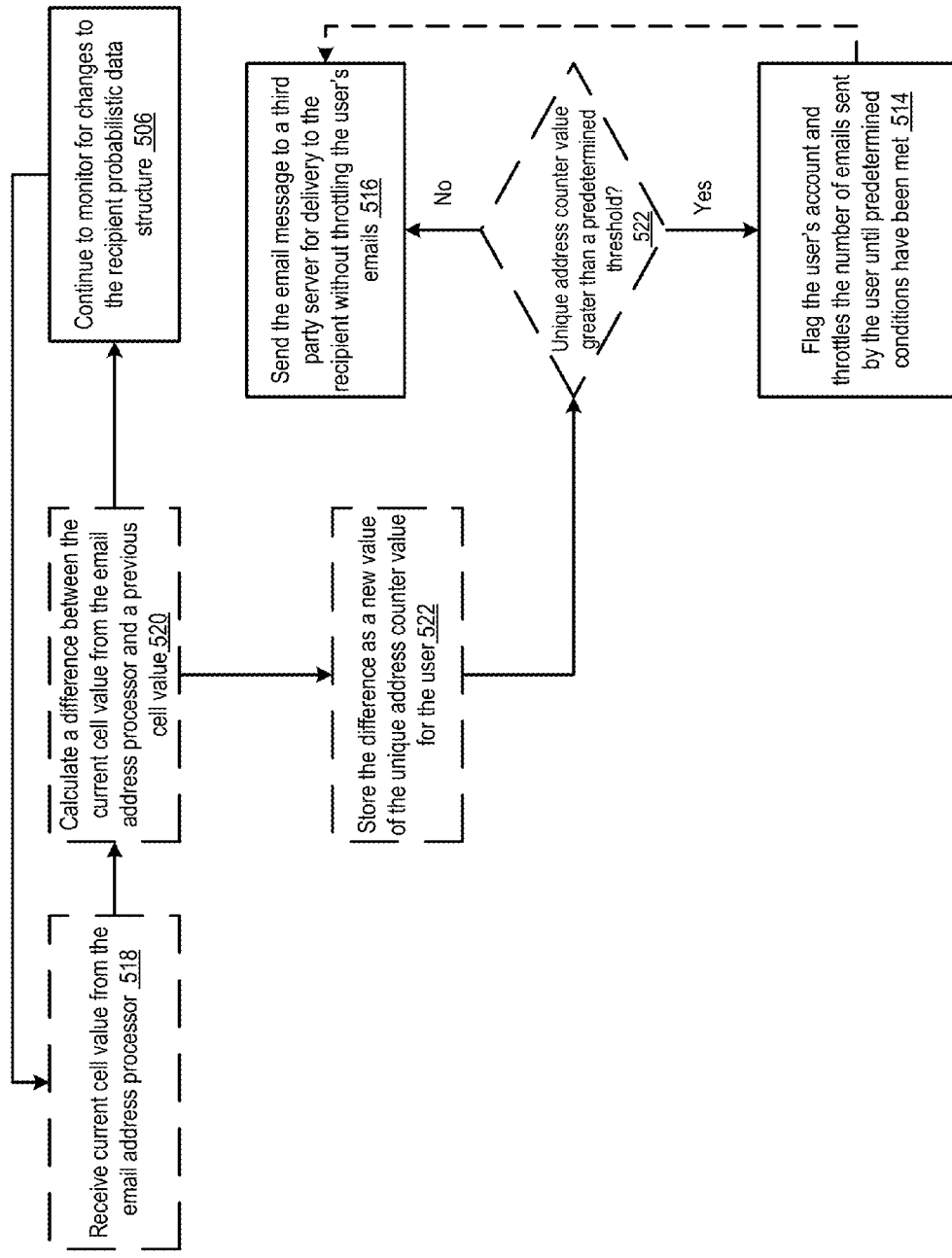

FIGS. 5A-B are logic flow diagrams illustrating a process for using a modified example recipient probabilistic data structure to determine whether or not to throttle a user account. For example, in some implementations (e.g., referring to FIG. 5A), the master email controller 120 can receive, at 502, a result code from the email address processor 118 indicating whether or not a user has sent an email to a recipient email address before. The master email controller 120 can determine, at 504, from the result code, for example, whether or not a recipient probabilistic data structure associated with the user's user account was modified. In some implementations the result code is a binary value (e.g., 1 and/or 0), where a "1" indicates that the recipient probabilistic data structure was modified, and a "0" indicates that the recipient probabilistic data structure was not modified. If the master email controller 120 determines that the recipient probabilistic data structure was not modified, the master email controller 120 can continue to monitor, at 506, for changes to the recipient probabilistic data structure associated with the user's user account.

In some implementations, if the master email controller 120 determines that the recipient probabilistic data structure was modified, based on the result code, the master email controller 120 can increment, at 508, and/or otherwise modify a unique address counter value for the user (e.g., the unique address counter value being stored at the master email controller 120, and/or stored in the user's user account data structure and managed by the master email controller 120). The unique address counter value can represent an estimated and/or predicted number of unique recipient email addresses to which the user has sent email. The master email controller 120 can also calculate, at 510, an updated recipient change rate, e.g., based on the unique address counter value, and at least one previously-calculated unique address counter value, and a previous recipient change rate value. The at least one previously-calculated unique address counter value can include values collected throughout the history of the user's user account, and/or can include values collected during a window of time (e.g., unique address counter value collected within the same hour, within the same day, within the same week, and/or the like). In other implementations, the unique address counter value can be updated to reflect a difference between a previous value in the recipient probabilistic data structure, and a recently-received value in the recipient probabilistic data structure (e.g., the unique address counter value can equal a difference between a previous cell value within the recipient probabilistic data structure, and a current cell value within the recipient probabilistic data structure). In this way, the master email controller 120 can calculate a recipient change rate over the span of the entire history of the user's user account, and/or can calculate a recipient change rate over a window of time, such as an hour, a day, and/or the like.

The master email controller 120 can then determine, at 512, whether the updated recipient change rate exceeds a predetermined threshold (e.g., whether the user has been sending emails to more new unique recipients than normal). If the master email controller 120 determines that the recipient change rate is less than or equal to the predetermined threshold, the master email controller 120 can forward, at 516, the email message sent by the user to a third party server for delivery to the recipient client device 104, e.g., without throttling the user's emails. If the master email controller 120 determines that the recipient change rate exceeds the predetermined threshold, the master email controller 120 can flag, at 514, the user's account, and can throttle the number of emails, the recipients of the user's emails, and/or the like, e.g., until predetermined conditions have been met (e.g., until the recipient change rate falls below the predetermined threshold, and/or similar criteria). In some implementations, the email to the recipient client device 104 can also be forwarded to the third-party server for delivery to the recipient client device 104, if the throttling of the user's emails does not affect transmission of the email message.

In other implementations (referring to FIG. 5B), instead of using a result code to determine whether or not a recipient probabilistic data structure was modified, and subsequently incrementing a unique address counter value (e.g., at 502-512), the master email controller 120 can, at 518, receive a current cell value from the email address processor 118. The master email controller 120 can, at 520, calculate a difference between the current cell value and a previous cell value at the same cell from which the current cell value was retrieved. The master email controller 120 can, at 522, store the difference as a new value of the unique address counter value for the user. The master email controller 120 can, at 522, determine whether the new unique address counter value exceeds a predetermined threshold. If the new unique address counter value does exceed the predetermined threshold, the master email controller 120 can, at 514, flag the user's account and throttle a number of emails sent by the user (e.g., similar to FIG. 5A). Alternatively, if the new unique address counter value does not exceed the predetermined threshold, the master email controller 120 can, at 516, send an email message being sent by the user to a third party server for delivery to the recipient, without throttling the user's emails (e.g., similar to FIG. 5A). In this manner, the unique address counter value can be set to directly indicate a difference between the current cell value and a previous cell value.

While embodiments and implementations herein have generally related to throttling email traffic through use of a recipient's email address, methods and apparatuses herein can be used for numerous other applications. For example, the mail verification server 108 can also throttle emails from a user using other data associated with the recipient, such as a recipient name, a combination of recipient contact information (e.g., the recipient email address, the recipient name, a recipient phone number, and/or other contact information), and/or similar data.

Additionally, the mail verification server 108 can also throttle communications in general, based on data identifying recipients of the communications. The mail verification server 108 can, for example, determine whether or not to throttle text, short message service (SMS) messages and/or multimedia messaging service (MMS) messages sent from a user, e.g., using recipient phone numbers and/or names for recipients of the text, SMS messages and/or MMS messages. The mail verification server can also determine whether or not to throttle social media messages, e.g., using the user names, real names, registered email addresses, and/or other such information of recipients of messages and/or posts from a user. The mail verification server 108 can also determine whether or not to throttle traffic from a first network device, e.g., using identifiers (e.g., a Media Access Control (MAC) address and/or other network identifier) of network devices receiving packets and/or other data from the first network device.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processors; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
an email address processor configured to receive an email data structure from a user, the email address processor configured to calculate a binary code based on a recipient email address included in the email data structure, the email address processor configured to select a portion of a recipient probabilistic data structure based on a first portion of the binary code, the email address processor configured to calculate a new cell value for the portion of the recipient probabilistic data structure based on a second portion of the binary code; and
a master email controller configured to receive the new cell value from the email address processor, the master email controller configured to calculate a difference between the current cell value and a previous cell value of the portion of the recipient probabilistic data structure, the master email controller configured to throttle a number of emails sent by the user when the difference between the current cell value and the previous cell value of the portion of the recipient probabilistic data structure exceeds a predetermined threshold.

2. The apparatus of claim 1, wherein the recipient probabilistic data structure is a HyperLogLog data structure.

3. The apparatus of claim 1, wherein the recipient probabilistic data structure is a bloom filter data structure.

4. The apparatus of claim 1, wherein:
the first portion of the binary code identifies an index of a cell in the recipient probabilistic data structure; and
the second portion of the binary code includes a number of leading zeroes, the new cell value being calculated by adding the number of leading zeroes to a constant value.

5. The apparatus of claim 1, wherein the master email controller is configured to forward the email sent by the user to a third-party email server when the recipient change rate is less than or equal to a predetermined threshold, without throttling the number of emails being sent by the user.

6. The apparatus of claim 1, wherein the master email controller is configured to end the throttling of the number of emails being sent by the user when the difference between the current cell value and the previous cell value of the portion of the recipient probabilistic data structure falls below the predetermined threshold.

7. The apparatus of claim 1, wherein the binary code is one of a hash value or a normalized string value representing the recipient email address.

8. A method, comprising:
receiving, at an email address processor, an email from a client device;
extracting a recipient email address from the email;
calculating a binary code using the recipient email address;
selecting a portion of a recipient probabilistic data structure, based on a first portion of the binary code;
calculating a new cell value for the portion of the recipient probabilistic data structure, based on a second portion of the binary code;
modifying the portion of the recipient probabilistic data structure, based on the new cell value, so as to generate a current cell value stored at the portion of the recipient probabilistic data structure;
calculating, at a master email controller, a difference between the current cell value and a previous cell value of the portion of the recipient probabilistic data structure; and
throttle a number of emails sent by a user associated with the client device, when the difference between the current cell value and the previous cell value of the portion of the recipient probabilistic data structure is greater than a predetermined threshold.

9. The method of claim 7, wherein:
the first portion of the binary code identifies an index of a cell in the recipient probabilistic data structure; and
the second portion of the binary code includes a number of leading zeroes, the new cell value being calculated by adding the number of leading zeroes to a constant value.

10. The method of claim 7, wherein the binary code is one of a hash value or a normalized string value representing the recipient email address.

11. The method of claim 7, wherein the recipient probabilistic data structure includes information that estimates a likelihood that the recipient email address has been included in an email sent by the user.

12. The method of claim 7, wherein the recipient probabilistic data structure is modified to include an updated estimate of a number of recipient email addresses that have been included in emails sent by the user, when the portion of the recipient probabilistic data structure is modified to generate the current cell value.

13. The method of claim 7, wherein the predetermined threshold is dynamically determined based on a recipient change rate of at least one other user.

14. A non-transitory processor-readable medium storing code representing instructions to be executed by a processor, the code comprising code to cause the processor to:
calculate a binary code based on a recipient email address from an email received from a user;
select a portion of a recipient probabilistic data structure, based on a first portion of the binary code;
calculate a potential new cell value for the portion of the recipient probabilistic data structure, based on a second portion of the binary code;
store the potential new cell value at the portion of the recipient probabilistic data structure when the potential new cell value is greater than a cell value currently stored at the portion of the recipient probabilistic data structure;
increment a unique address counter value associated with the user, when the potential new cell value is stored;
calculate a recipient change rate, based on the unique address counter value and a previous unique address counter value; and
throttle a number of emails being sent by the user when the recipient change rate exceeds a predetermined threshold.

15. The non-transitory processor-readable medium of claim 14, wherein the potential new cell value being greater than a cell value currently stored at the portion of the recipient probabilistic data structure indicates a likelihood that the recipient email address has not been added to the recipient probabilistic data structure.

16. The non-transitory processor-readable medium of claim 14, wherein the unique address counter value indicates a predicted number of unique recipient addresses included in emails sent by the user.

17. The non-transitory processor-readable medium of claim 14, wherein the code further comprises code to cause the processor to:
discard the potential new cell value when the potential new cell value is equal to or less than a value stored at the portion of the recipient probabilistic data structure; and
generate a result code indicating that no modification was made to the recipient probabilistic data structure when the potential new cell value is equal to or less than a value stored at the portion of the recipient probabilistic data structure.

18. The non-transitory processor-readable medium of claim 14, wherein the code further comprises code to cause the processor to send the email sent by the user to a third-party email server when the recipient change rate is less than or equal to a predetermined threshold, without throttling the number of emails being sent by the user.

19. The non-transitory processor-readable medium of claim 14, wherein the code further comprises code to:
determine whether the potential new cell value is greater than the cell value currently stored at the portion of the recipient probabilistic data structure; and
generate a result code, the result code being a binary value indicating whether the potential new cell value is greater than the cell value currently stored at the portion of the recipient probabilistic data structure.

20. The non-transitory processor-readable medium of claim 14, wherein the binary code is a first binary code, the potential new cell value is further calculated at least in part based on a portion of a second binary code generated based on a recipient name extracted from the email.

\* \* \* \* \*